United States Patent [19]

Glatthorn et al.

[11] 4,319,113
[45] Mar. 9, 1982

[54] APPARATUS FOR WELDING TUBES TO A TUBESHEET UTILIZING A CONTINUOUS WELD

[75] Inventors: Raymond H. Glatthorn, St. Petersburg; Robert E. Monley, Tampa; Urban A. Schneider, St. Petersburg, all of Fla.

[73] Assignee: Westinghouse Electric Corp., Pittsburgh, Pa.

[21] Appl. No.: 148,449

[22] Filed: May 9, 1980

[51] Int. Cl.³ .............................................. B23K 9/02
[52] U.S. Cl. ................................. 219/60.2; 219/60 R; 219/125.11; 228/29
[58] Field of Search .................. 219/60 R, 60 A, 60.2, 219/125.11; 228/29

[56] References Cited

U.S. PATENT DOCUMENTS

| | | | |
|---|---|---|---|
| 1,949,251 | 2/1934 | Gilbert | 219/60.2 |
| 3,675,841 | 7/1972 | Gutlhuber et al. | 219/60.2 X |
| 4,072,828 | 2/1978 | Thome | 219/60 A X |

*Primary Examiner*—J. V. Truhe
*Assistant Examiner*—Keith E. George
*Attorney, Agent, or Firm*—F. J. Baehr, Jr.

[57] ABSTRACT

A welding torch is rotatably mounted in a carriage. The carriage and welding torch are driven by motors and driveshafts mounted on a base to provide a light carriage which can be rapidly accelerated as the torch moves from tube to tube when forming a continuous weld encompassing the juncture of a plurality of tubes.

3 Claims, 3 Drawing Figures

APPARATUS FOR WELDING TUBES TO A TUBESHEET UTILIZING A CONTINUOUS WELD

BACKGROUND OF THE INVENTION

This invention relates to apparatus for welding tubes to a tubesheet of a heat exchanger and more particularly to such an apparatus utilizing a continuous weld to weld a portion of a row of tubes to a tubesheet.

When welding tubes to a tubesheet, initiating and extinguishing the arc as each tube is welded to the tubesheet requires a considerable portion of the total welding time, and also during the initiation and extinguishing of the arc the quality of the weld is likely to be lower than during other portions of the weld.

SUMMARY OF THE INVENTION

In general, apparatus for welding tubes to a tubesheet utilizing a continuous weld, when made in accordance with this invention, comprises a base disposed on opposite ends of the apparatus, each base having means disposed therein for detachably attaching the base to the tubesheet, means for connecting the bases together and a carriage slidably disposed between the bases. A welding torch is rotatably disposed on the carriage and has means for intermittently moving the carriage between the bases and means for intermittently rotating the welding torch. The torch also has means for accurately locating the torch with respect to each tube prior to the activation of the means for rotating the torch whereby when the means for moving the carriage and the means for rotating the torch are activated serially, a continuous weld will be formed and this weld will incorporate the juncture of a given number of tubes disposed in a row in the tubesheet.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
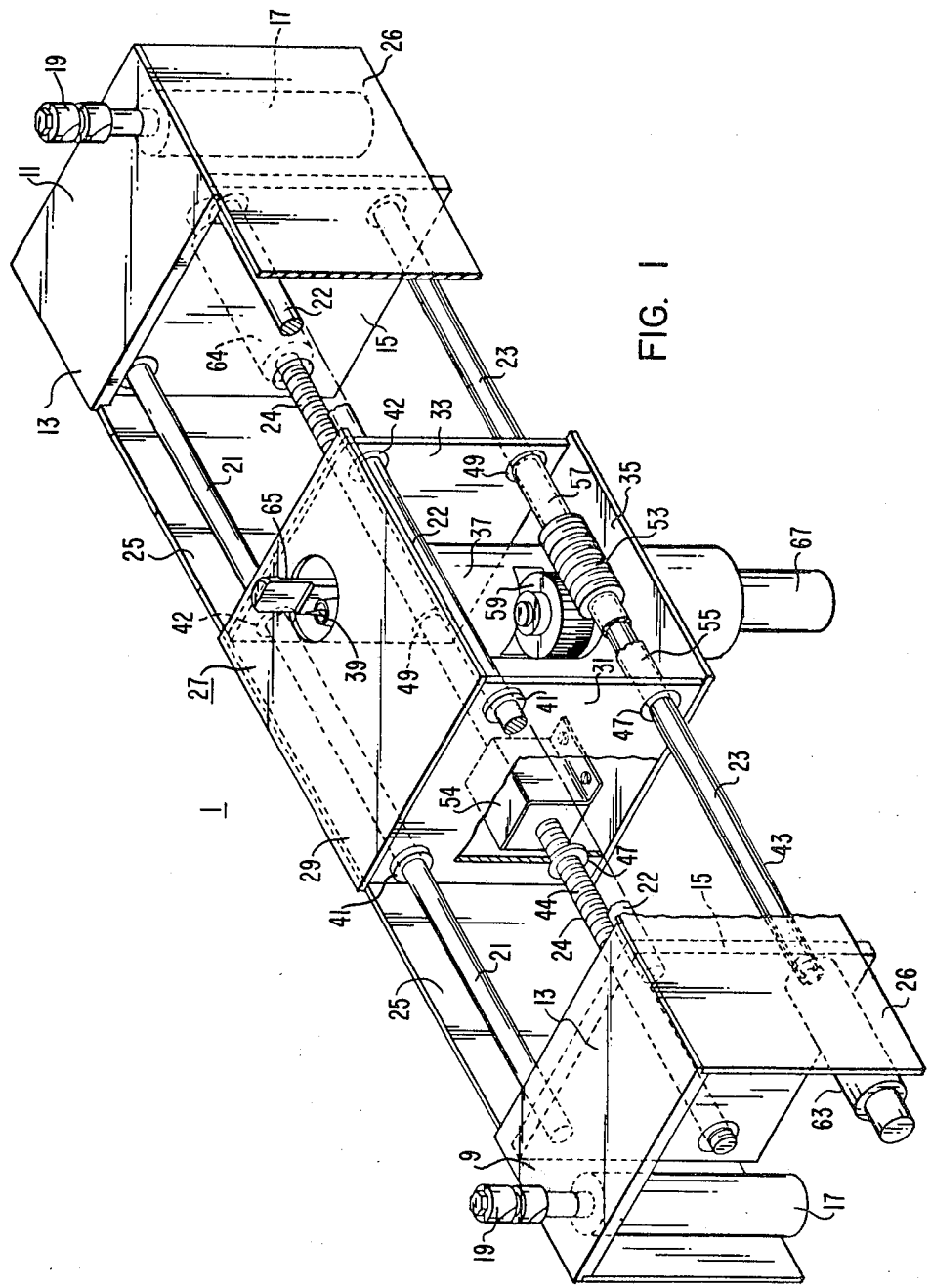
FIG. 1 is an isometric drawing of apparatus made in accordance with this invention.

Referring now to the drawings in detail there is shown an apparatus 1 for welding tubes 3 to a tubesheet 5 utilizing a continuous weld 7 extending over a portion of a row of tubes.

As shown best in FIG. 1 the apparatus comprises a pair of bases 9 and 11 disposed on opposite ends thereof. The bases 9 and 11 each comprise a faceplate 13 which is disposed parallel to the tubesheet 5, and end plates 15 disposed normal to the faceplates 13. Each faceplate 13 has disposed thereon means for detachably attaching the bases 9 and 11 to the tubesheets. The base attaching means comprise a pneumatic or hydraulic cylinder 17 and an elastomer sleeve 19 which is compressed lengthwise by the cylinder 17 when the elastomer is inserted into a tube 3 or hole in the tubesheet 7 in order to hold the bases in position against the tubesheet 5.

Four round rods or bars 21, 22, 23 and 24 and side plates 25 and 26 extend between and form means for rigidly connecting the bases 9 and 11.

A carriage 27 is slidably disposed on the bars 21, 22, 23 and 24 and side plates 25 and 26. The carriage 27 comprises a faceplate 29 disposed parallel to the tubesheet 5, end plates 31 and 33 and a bottom plate 35.

A welding torch 37 is rotatably disposed in the carriage so that its longitudinal axis is perpendicular to the faceplate 29 and has an electrode 39 which extends beyond the faceplate 29.

The bars 21 and 22 are fixed to the end plates 15 and have ball bushings 41 and 42, respectively, slidably disposed thereon. The ball bushings 41 and 42 are fastened to the end plates 31 and 33 of the carriage 27 so that the carriage 27 slides freely along the bars 21 and 22. The bar 23 has a spline 43 and the bar 24 has threads 44. Bushings 47 and 49 are disposed in the end plates 31 and 32 so that the bars 23 and 24 pass therethrough allowing the carriage 27 to slide freely on the bars 23 and 24.

A worm 53 is slidably disposed over the spline 43 of the bar 23 so as to rotate therewith and a ball screw nut 54 threadedly engages the threads 44 of the bar 24. The ball screw nut 54 is attached to the bottom plate 35 of the carriage to move the carriage rectilinearly between the bases 9 and 11.

Spacers 55 and 57 fix the position of the worm 53 within the carriage and a worm gear 59 cooperates with other gears (not shown) to rotate the torch 37 about its longitudinal axis as the spline shaft 23 is intermittently turned by a motor drive or other drive means 63. The threaded bar 24 is intermittently driven in either direction by a drive motor or the drive means 64 to move the carriage between the bases 9 and 11.

The welding torch 37 has a probe 65 or other means for accurately locating the torch 37 with respect to each tube 3. The probe 65 is inserted and extracted from the tubes 3 by a pneumatic or hydraulic cylinder or other means 67. The probe 65 has a boss or cam 69 disposed thereon. A shoulder or cam follower 61 or other means is disposed on the torch 37 for moving the electrode 39 away from the central axis of the torch 37 when the probe 65 is in a position other than being fully inserted in a tube 3 in order to keep the arc on the tubesheet except during that period when the torch is being rotated and is forming a circular weld in excess of 360° at the juncture of a tube 3 and the tubesheet 5.

Figure 2:
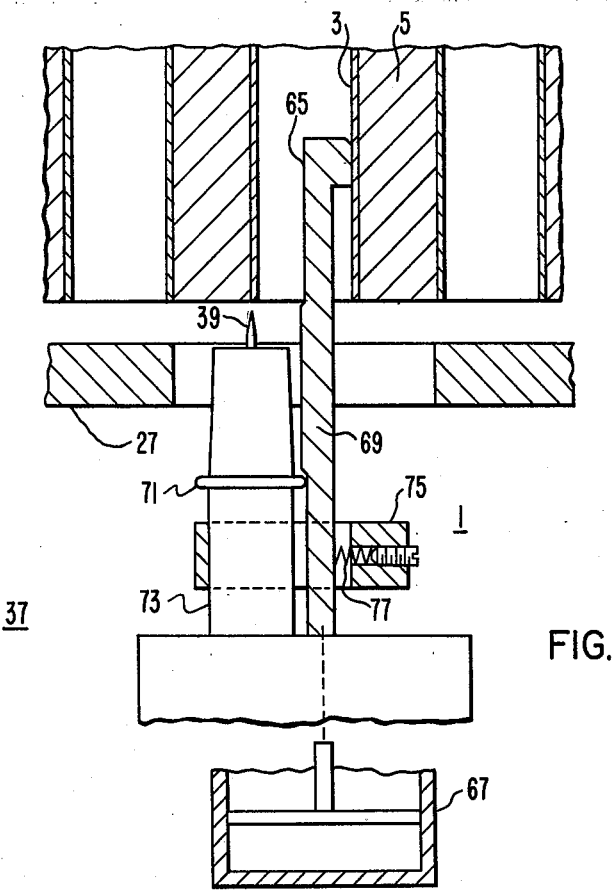
FIG. 2 is a partial sectional view of the apparatus.

As shown in FIG. 2 the torch 27 has an electrode holder 73 which has the shoulder 71 disposed thereon and the boss 69 is disposed on the probe 65. A ring 75 and spring or other biasing means 77 bias the probe 65 and electrode holder 73 toward each other thus allowing the electrode holder 73 and electrode 39 to move away from the probe 65 and central axis of the torch 37 when the probe 65 is in a position other than fully extended.

Figure 3:
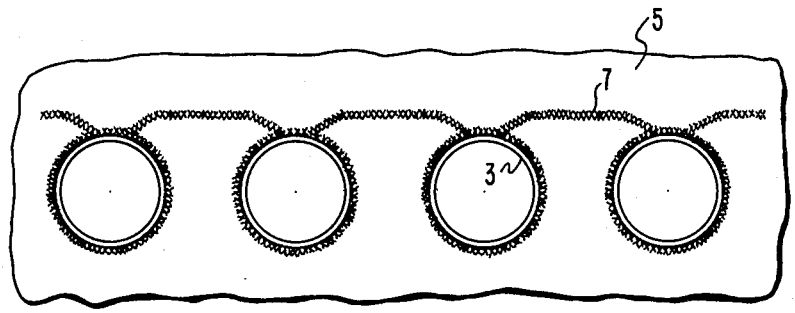
FIG. 3 is a partial plan view of a tubesheet showing the continuous weld made by the apparatus.

As shown in FIG. 3 the apparatus hereinbefore described can advantageously weld a plurality of tubes to a tubesheet utilizing a continuous weld caused by an arc which is initiated and extinguished on the tubesheet 5 and not at the juncture of a tube 3 and the tubesheet 5. The arc is rotated when the probe 65 is in a tube 3 and moves rectilinearly when the probe 65 is not in a tube 3 by intermittently actuating the motor drives 63 and 64.

What is claimed is:

1. Apparatus for welding tubes to a tube sheet utilizing a continuous weld, said apparatus comprising:

a base member disposed on opposite ends of the apparatus, each base member having means disposed thereon for detachably attaching the apparatus to the tube sheet;

a plurality of bars disposed between the base members and connecting them together;

a carriage slidably disposed on said bars;

a welding torch rotatably disposed in said carriage;

a first drive motor attached to one of said bars for intermittently moving said carriage between said base member;

a second drive motor attached to another of said bars for intermittently rotating said torch, and means attached to said torch for accurately locating the torch with respect to each tube prior to the rotating means being activated whereby by activating the drive motors serially a continuous weld will be formed incorporating the juncture of a given number of tubes and the tube sheet.

2. Apparatus as set forth in claim 1, wherein the means for accurately locating the torch has disposed thereon means for causing the torch to rotate about a circular path larger than the circle of the juncture of the tube and tubesheet.

3. Apparatus as set forth in claim 2 wherein the means for causing the torch to rotate on a circle larger than the circle of the juncture of the tube and the tubesheet comprises a cam and cam follower which cooperate to move the torch away from the central axis of the locating means except when the locating means is fully inserted in a tube.

* * * * *